United States Patent [19]

Rafferty

[11] Patent Number: 5,454,911
[45] Date of Patent: Oct. 3, 1995

[54] APPARATUS FOR HYDROLYZING AND DRYING LIGNOCELLULOSIC MATERIAL

[75] Inventor: Andrew J. Rafferty, Christchurch, New Zealand

[73] Assignee: Convertech Group Limited, Rangiora, New Zealand

[21] Appl. No.: 139,152

[22] Filed: Oct. 21, 1993

Related U.S. Application Data

[62] Division of Ser. No. 520,198, May 9, 1990, Pat. No. 5,328, 562.

[30] Foreign Application Priority Data

May 11, 1989 [NZ] New Zealand ............................ 229080

[51] Int. Cl.[6] ................ D21C 7/00; D21C 7/08; D21C 7/10
[52] U.S. Cl. ............................ 162/247; 162/246; 162/21; 162/47; 127/37
[58] Field of Search ................... 162/21, 68, 47, 162/247, 19, 52, 246; 241/5; 127/36, 37

[56] References Cited

U.S. PATENT DOCUMENTS

| | | | |
|---|---|---|---|
| 1,995,145 | 3/1935 | Frost | 162/125 |
| 2,947,654 | 8/1960 | Chapman | 162/125 |
| 4,152,197 | 5/1979 | Lindahl et al. | 162/68 |
| 4,326,913 | 4/1982 | Mattsson | 162/17 |
| 4,708,746 | 11/1987 | Hinger | 162/68 |

Primary Examiner—W. Gary Jones
Assistant Examiner—Dean T. Nguyen
Attorney, Agent, or Firm—Nikaido, Marmelstein, Murray & Oram

[57] ABSTRACT

An energy efficient process for hydrolyzing lignocellulosic materials which comprises using a primary system by providing a start-up energy input to operating saturated steam conditions and thereafter operating the primary system with substantially constant energy input, the condition of the hydrolyzing saturated steam being controlled by water injection and/or steam bleeding from the primary system. The dwell time of the solids stream in the primary sustem is controlled by controlling its passage with flashing off of steam into a secondary system where drying occurs together with some small measure of hydrolysis in a lower pressure superheated steam environment, there being an energy input into the secondary system using steam bled from the primary system. The output solids material stream is preferably capable of being self polymerized into a formed shape eg a board.

10 Claims, 3 Drawing Sheets

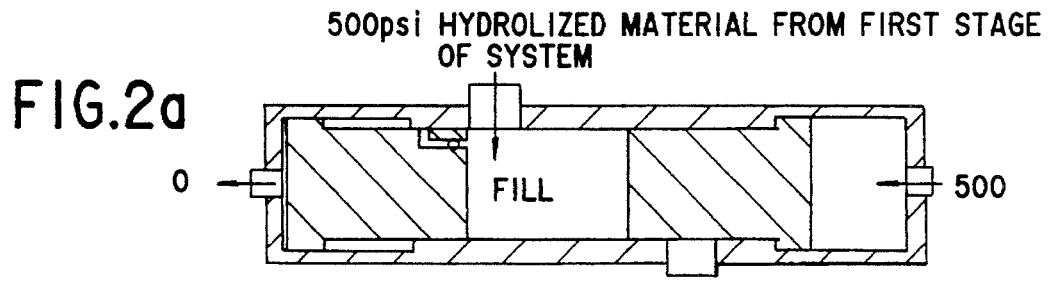
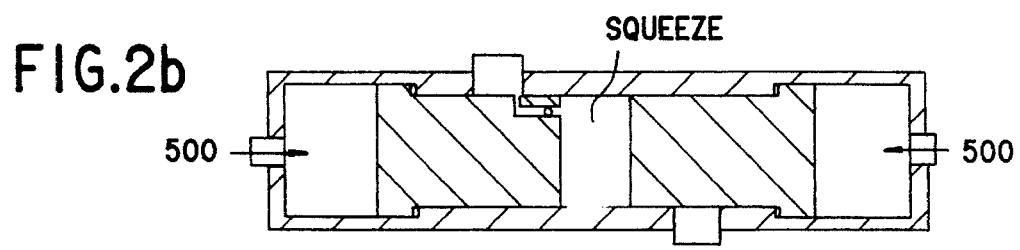
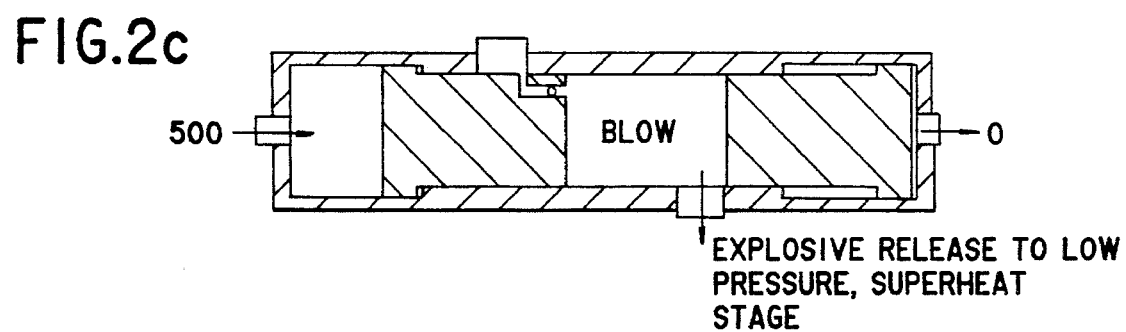
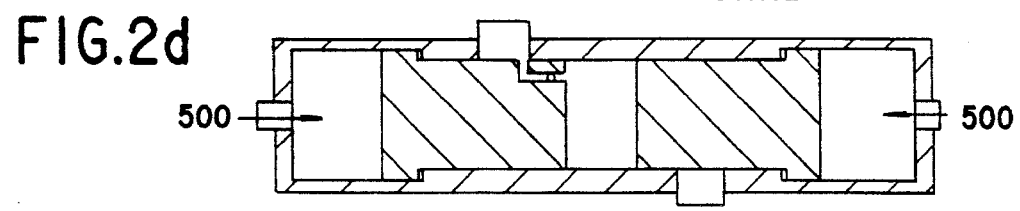
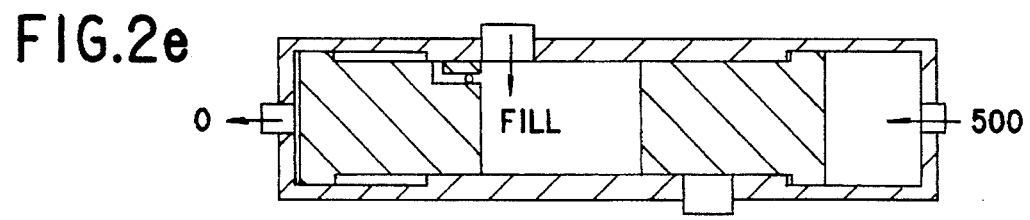

APPARATUS FOR HYDROLYZING AND DRYING LIGNOCELLULOSIC MATERIAL

This is a division of application Ser. No. 07/520,198 filed May 9, 1990, now U.S. Pat. No. 5,328,562

The present invention relates to improved processes systems plant and related product for hydrolysing and making use of hydrolysed lignocellulosic materials.

BACKGROUND OF THE INVENTION

Most scientists know that many very valuable products can be made from plant fibre pulp prepared by a laboratory method known as "explosion hydrolysis" Unfortunately; in order to get $1 worth of these products, one must spend most of that $1 on heat energy and other costs. Huge amounts of research money have been applied world-wide in the quest for a commercially viable process with little success.

"Explosion" hydrolysis consists of placing a charge of wood chips or similar cellulosic materials into a strong, closed pressure vessel in order to bring a thermochemical modification. High pressure steam is passed through the material for a specified time, according to temperature. At the end of the steaming period a valve on the bottom of the vessel is opened and the hydrolysed material is "exploded" out of the vessel. What comes out of the vessel is a rather soggy, very hot, wet substance which is ready to be processed so as to utilise the various chemicals which have been liberated by the hydrolysis.

In it's simplest form, explosion hydrolysis is carried out without any chemicals or additives but catalysts can be used. Explosion hydrolysis was used extensively in Germany during the war period when the shortage of chemicals meant that the economic considerations were over-ridden by a desperate need for the end products. A tremendous resurgence of interest in explosion hydrolysis also arose during the early 1970's when the costs of petro-chemicals began to sky-rocket. Large numbers of new projects were initiated at that time when it was thought that explosion hydrolysis would be rendered more competitive. With the recession in oil prices the projects were abandoned.

There is no doubt as to the value of hydrolysed lignocellulose fibre, but up until now, it's use has been totally circumscribed in the absence of an economic, large scale production method. There has been absolutely no interest in the production of the valuable substances found in bio-mass because of a total concentration and reliance on petrochemical. Strong incentives to increase bio-mass plantings in order to reverse the carbon dioxide balance coincides with the emergence of this new technology.

There is no real substitute for the use of heat in the process of hydrolysis of lignocellulosic material and the laws of thermo-dynamics ensure that there are not short-cuts as to the amount of heat which is required. The reason that the process has been uneconomic in the past is that it has been possible to use the heat only once and, at the end of each cycle, the heat has almost been totally lost to the atmosphere.

[Explosion hydrolysis was very widely practiced in the 1930's and right up to the present day to produce hardboard by the Masonite process. The practice has almost completely disappeared and been replaced by more efficient methods. Hardboard made by the Masonite process was bonded entirely with natural resins produced by the process and no synthetics were used. Unfortunately, 100 tonnes of water were needed for every one ton of fibre produced which brought enormous pollution problems].

The present invention provides a totally different apparatus in which the hydrolysis preferably proceeds within a continuous energy re-circulation system where there is a minimum of waste. Even surplus heat is available in a valuable form. The innovation represents an enormous break-through where an old, well known but previously uneconomic process has been brought into the space age. The immensely efficient, pollution-free energy system is economically competitive, no matter how low oil prices sink, making woody plant fibre bio-mass a certain alternative as a chemical feed material.

OBJECTS AND SUMMARY OF THE INVENTION

It is an object of the present invention therefore to provide an alternative to prior art processes, systems plant.

Accordingly in one aspect the present invention consists in a process for preparing a hydrolysed lignocellulosic material substantially devoid of available water from a source of lignocellulosic material, said process comprising the steps of;

start up preparing a hydrolysis system for an input of lignocellulosic material by a heat exchange energy build up and water injection to provide a primary system having a hydrolysing zone of a circulating stream of saturated steam under elevated pressure and temperature, introducing into the circulating stream once hydrolysis conditions are attained for the desired hydrolysis, a feed of lignocellulosic material to be carried as being hydolysed in the circulating saturated steam stream to an outlet zone of the primary system, thereafter passing from the outlet of the primary system the still heated solids stream of lignocellulosic material that has been at least substantially hydrolysed into a secondary system having a circulating hydrolysing zone of superheated steam, the passing of the solids stream between the systems resulting in the flashing off of at least some moisture at a reduced pressure to that of the primary system as the hydrolysis continues to some extent, and at a desired dryness extracting and/or using the solids stream from the secondary system, the process being additionally characterised in that there is a substantially constant heat exchange input into the primary system at least after start up and the adjustment of the saturated steam conditions within the primary system is by a control of the solids input (if the solids are moist), control of any further water injection into the primary system, and a control of steam bled as an energy outlet from the primary system, and being further characterised that there is no substantial free passage of saturated steam from the primary system into the superheated steam zone of the secondary system.

DETAILED DESCRIPTION OF THE INVENTION

Preferably the passing from the primary system to the secondary hydrolysing system is by means of an auger or screw controllable as to speed of rotation, the speed of which is finally determinative of the period of time under which solids material injected into the primary system is subjected to the hydrolysing conditions of the primary system.

Preferably the primary system is used as an energy source for attaining and/or maintaining at least in part the temperature of the secondary system.

Preferably said secondary system in use is heated solely by steam bled from the primary system and the heat of the solids stream.

Preferably the feed to said auger or screw is from the base of a cyclone.

Preferably the feed from the auger or screw is through a pressure reducing system into said secondary system adapted to minimise loss of saturated steam of the primary system.

Preferably said solids stream is taken from a cyclone of the secondary system.

Preferably said solids stream taken from the secondary system is pressed at a suitable temperature and pressure into a self polymerising form.

Preferably the circulating zone of each of the primary and secondary systems involves the use in each of at least one fan.

In a further aspect of the present invention consists in, in a two stage system for hydrolysing lignocellulosic material where hydrolysis is performed using a saturated steam carrier for the lignocellulosic material in a first stage hydrolysis system and continues into a second stage using a superheated steam carrier, a method of energy control in the system which comprises:

(a) building up energy in the first stage hydrolysis system using heat exchange transfer into the system, (b) only once sufficient energy has been introduced into the first stage hydrolysis system commencing the controlled hydrolysis of the lignocellulosic material only then being introduced while introducing into the hydrolysis system sufficient energy via heat exchange means and water (in the lignocellulosic material or otherwise) to maintain the system in a substantially steady state while excess steam is being bled from the hydrolysis system and as the solids material is removed after having been subjected to the hydrolysing conditions for a desired time, and (c) providing or at least maintaining the superheated steam carrier in the second stage system by flashing steam from the moisture of the substantially hydrolysed lignocellulosic material as it is transferred from the first stage hydrolysis system to the second stage hydrolysis system, the superheated steam of the second system being maintained as superheated steam by heat exchange and a bleeding of excess superheated steam from the second stage system as the substantially dry hydrolysed material is removed therefrom.

Preferably the heat exchange of said second stage hydrolysis system is with steam bled from the first stage hydrolysis system.

Preferably excess steam bled from the first stage hydrolysis system beyond that used for heat exchange of said second stage hydrolysis system is deployed elsewhere as a usable steam source.

Preferably the dry cellulosic material obtained as a product is at least in part pressed into a self polymerising form under a suitable pressure and temperature.

In still a further aspect the present invention consists in plant which in use can perform a process for preparing a hydrolysed lignocellulosic material substantially devoid of available water from a source of lignocellulosic material, said process comprising the steps of;

start up preparing a hydrolysis system for an input of lignocellulosic material by a heat exchange energy build up and water injection to provide a primary system having a hydrolysing zone of a circulating stream of saturated steam under elevated pressure and temperature, introducing into the circulating stream once hydrolysis conditions are attained for the desired hydrolysis, a feed of lignocellulosic material to be carried as being hydrolysed in the circulating saturated steam stream to an outlet zone of the primary system, thereafter passing from the outlet of the primary system the still heated solids stream of lignocellulosic material that has been at least substantially hydrolysed into a secondary system having a circulating hydrolysing zone of superheated steam, the passing of the solids stream between the systems resulting in the flashing off of at least some moisture at a reduced pressure to that of the primary system as the hydrolysis continues to some extent, and at a desired dryness extracting and/or using the solids stream from the secondary system, the process being additionally characterised in that there is a substantially constant heat exchange input into the primary system at least after start up and the adjustment of the saturated steam conditions within the primary system is by a control of the solids input (if the solids are moist), control of any further water injection into the primary system, and a control of steam bled as an energy outlet from the primary system, and being further characterised that there is no substantial free passage of saturated steam from the primary system into the superheated steam zone of the secondary system, said plant comprising;

a primary hydrolysis plant having a circulatory hydrolysis zone to operate at an elevated pressure and temperature, an inlet for lignocellulosic solids, a controllable water injection means into said zone, a bleed off valve for excess steam from said zone, a solids outlet, fan means to cause a circulatory movement of steam in said zone and entrainment of the lignocellulosic solids in the stream from the inlet thereof to an outlet, and a cyclone to gravity accumulate the solids at the outlet, a secondary hydrolysis plant having a circulatory hydrolysis/drying zone to operate at a lower pressure than the primary hydrolysis zone, an inlet to receive into the hydrolysis/drying zone the solids from the outlet of said primary zone, an outlet for superheated steam, a solids outlet, fan means to cause a circulatory movement of steam in said zone and entrainment of the solids in the stream from the inlet to said zone to the solids outlet, and a cyclone to gravity direct the solids to the outlet, an auger or screw including means controllable as to speed of rotation to feed solids materials between the outlet of the primary zone to the inlet of the secondary hydrolysis plant without a substantial passage of saturated steam from the first zone, heat exchange means for heating said primary zone, heat exchange means for heating said secondary hydrolysis plant, and means to control as required for the process to be performed the dwell time of solids and steam conditions in at least the primary plant.

Preferably at least some of the steam released from the primary hydrolysis plant by said bleed off valve provides a heat input to said heat exchange means for heating said secondary hydrolysis plant.

Preferably said means to control dwell time and steam conditions controls the plant such that it performs a process whereby there can be an energy control in the system whereby there is;

(a) on start up a building up of energy in the primary hydrolysis system using said heat exchange means thereof, (b) only once sufficient energy has been introduced into the primary hydrolysis system commencing the controlled hydrolysis of the lignocellulosic material only then being introduced while introducing into the primary hydrolysis system sufficient energy via said heat exchange means of the primary hydrolysis system and water (in the lignocellulosic material or otherwise) to maintain the system in a substantially steady state while excess steam is being bled from the hydrolysis system and as the solids material is removed after having been subjected to the hydrolysing conditions for a desired time, (c) providing or at least maintaining the superheated steam carrier in the secondary hydrolysis system by flashing steam from the moisture of the substantially hydrolysed lignocellulosic material as it is transferred from the primary hydrolysis system to the secondary hydrolysis system, the superheated steam of the second system being maintained as superheated steam by the heat exchange means of the secondary plant and a bleeding of excess superheated steam from the secondary system, and (d) removing substantially dry hydrolysed material from the secondary system.

Preferably said auger or screw including means includes a device to minimise the substantial passage of saturated steam from the primary hydrolysis zone into the secondary hydrolysis plant, such apparatus comprising;

means defining a chamber having an inlet port and an outlet port, a first valving element disposed in said chamber movable to open or close said inlet port, a second valving element disposed in said chamber movable to open or close said inlet port, means whereby said valving element can be caused to move as required, the construction and arrangement being such that in use solids from the primary zone under a fluid pressure can enter said chamber while said outlet port is closed and the inlet port is closed before the outlet port is opened to allow said solids under the fluid pressure of the primary zone to egress therefrom into the secondary hydrolysis zone.

In yet a further aspect the present invention consists in a formed product created from a self polymerising hydrolysed lignocellulosic material under a form creating pressure and temperature wherein said hydrolysed lignocellulosic material has been prepared by a process for preparing a hydrolysed lignocellulosic material substantially devoid of available water from a source of lignocellulosic material, said process comprising the steps of;

start up preparing a hydrolysis system for an input of lignocellulosic material by a heat exchange energy build up and water injection to provide a primary system having a hydrolysing zone of a circulating stream of saturated steam under elevated pressure and temperature, introducing into the circulating stream once hydrolysis conditions are attained for the desired hydrolysis, a feed of lignocellulosic material to be carried as being hydolysed in the circulating saturated steam stream to an outlet zone of the primary system, thereafter passing from the outlet of the primary system the still heated solids stream of lignocellulosic material that has been at least substantially hydrolysed into a secondary system having a circulating hydrolysing zone of superheated steam, the passing of the solids stream between the systems resulting in the flashing off of at least some moisture at a reduced pressure to that of the primary system as the hydrolysis continues to some extent, and at a desired dryness extracting and/or using the solids stream from the secondary system, the process being additionally characterised in that there is a substantially constant heat exchange input into the primary system at least after start up and the adjustment of the saturated steam conditions within the primary system is by a control of the solids input (if the solids are moist), control of any further water injection into the primary system, and a control of steam bled as an energy outlet from the primary system, and being further characterised that there is no substantial free passage of saturated steam from the primary system into the superheated steam zone of the secondary system.

In still a further aspect the present invention consists in a formed product created from a self polymerising hydrolysed lignocellulosic material under a form creating pressure and temperature wherein said hydrolysed lignocellulosic material has been provided from a two stage system for hydrolising lignocellulosic material where hydrolysis is performed using a saturated steam carrier for the lignocellulosic material in a first stage hydrolysis system and continues into a second stage using a superheated steam carrier, wherein there was performed a method of energy control in the system which comprises:

(a) building up energy in the first stage hydrolysis system using heat exchange transfer into the system, (b) only once sufficient energy has been introduced into the first stage hydrolysis system commencing the controlled hydrolysis of the lignocellulosic material only then being introduced while introducing into the hydrolysis system sufficient energy via heat exchange means and water (in the lignocellulosic material or otherwise) to maintain the system in a substantially steady state while excess steam is being bled from the hydrolysis system and as the solids material is removed after having been subjected to the hydrolysing conditions for a desired time, and (c) providing or at least maintaining the superheated steam carrier in the second stage system by flashing steam from the moisture of the substantially hydrolysed lignocellulosic material as it is transferred from the first stage hydrolysis system to the second stage hydrolysis system, the superheated steam of the second system being maintained as superheated steam by heat exchange and a bleeding of excess superheated steam from the second stage system as the substantially dry hydrolysed material is removed therefrom.

Preferably the product of either of the preceding two paragraphs is a board or panel.

BRIEF DESCRIPTION OF THE DRAWING

The preferred form of the present invention will now be described with reference to the accompanying drawings in which FIGS. 2a to 2e show a sequence of movements of a preferred form of the pressure reducing system which operates in association with the preferred screw or auger feed of material from the primary system into the secondary system, said pressure reducing system being adapted to minimise the loss of saturated steam of the primary steam into the superheated steam environment of the secondary system.

The present invention relates to improvements in methods of processing solids (preferably wet solids) to a dryer state while affecting hydrolysis related reactions therein. It also relates to improvements in methods of continuously softening and/or hydrolysing such materials whether containing either a high or low moisture content and then, subsequently, but during the same cycle, carrying out a drying process (with some measure of additional hydrolysis thereby effecting economy of energy use and reducing the ommission of undesirable substances into the atmosphere.

Because the temperature of the drying side is lower than that in the hydrolysis side, hydrolysis is slowed very considerably and ceases when the water is evaporated. It is still true to say that hydrolysis will continue because moisture, heat and pressure are still present although the rate will have slowed because of the low order of the heat and pressure.

Figures 1, 1A, 1B:
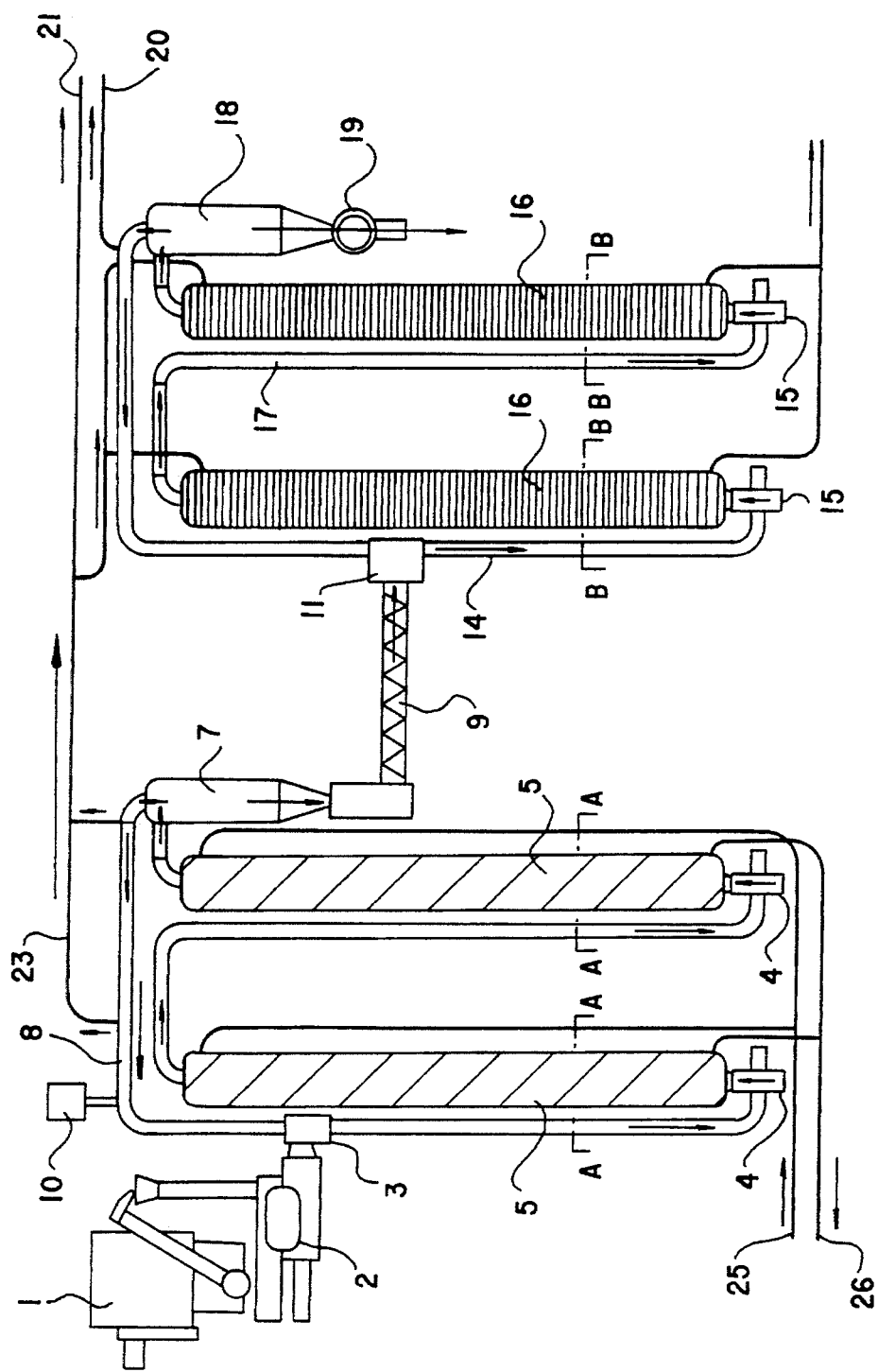
FIG. 1 is a flow diagram showing diagramatically the plant of the present invention showing the primary system having, by way of example, two interconnected heat exchange associated sections and also showing a similar arrangement for the preferred secondary system which affects some hydrolysis and provides the drying.
FIG. 1A is a section of the heat exchange portion of the primary system at AA and, FIG. 1B is a cross section of the section BB of the heat exchange region of each of the preferred two or more regions of the secondary system.

FIG. 1 shows a preferred flow arrangement in the embodiment as shown the primary system is being shown as having a bank of two shell and tube type heat exchangers while the secondary system (ie the second stage hydrolysis/drying system) similarly is shown as having two shell and tube type heat exchanges. Obviously the number of such heat exchangers and whether or not they are distinct from each other is not an essential feature of the present invention. It may be appropriate to have larger banks than those shown.

In operation, for example a hammer mill 1 could be used to break up the lignocellulosic material eg wood chips. It should be appreciated that other source materials may not require the use of such a hammer mill.

Included in the materials which can be used as feeds and from which valuable products can be extracted are the following:

All woody plant material including leaves, twigs, bark etc
Peats
Filtercake from sewage plants
Sewage effluents, animal waste, etc (all kinds of cellulosic residues)

The use of the hammer mill breaks up the woody materials along the grain and this will assist heat penetration. If desired condensate produced at a later stage can be used to preheat the particles and to give them a wash prior to injection but after hammer milling at 1.

Figure 3:
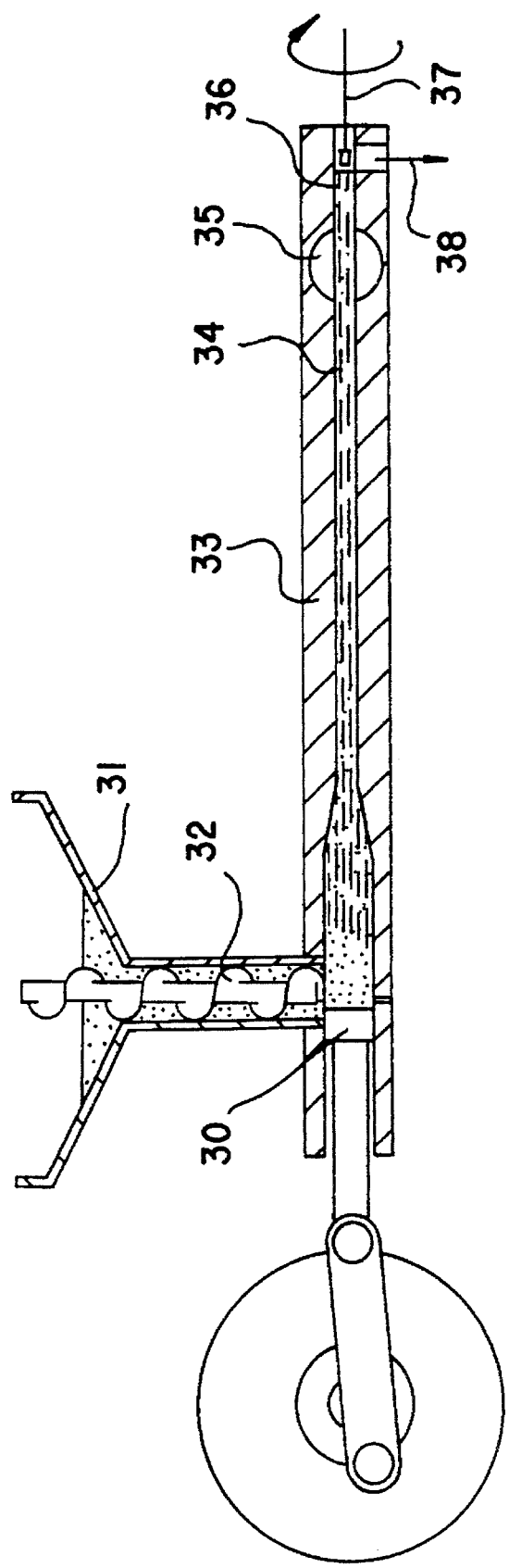
FIG. 3 shows diagramatically the preferred form of the means whereby particular lignocellulosic material may be injected without loss of pressure into the primary system at the inlet thereof.

The prepared feed material, as particles, is then injected into the carrier stream of the primary system at point 3 preferably by means of a high pressure plugging machine 2 such as shown in FIG. 3.

It can be seen from the diagram of FIG. 3 that an auger 32 supplies a feed of the cellulosic particulate material into the receiving zone of the bore 34 of a barrel type member 33 in such a way that an eccentric plug ram 30 can urge the same in the direction to the right through a plug valve 35 (adapted to stop blow back), the advancing end of the plug of compressed particulate material being eroded at its face 36 by a rotary cutter or the like which rotates in the arrowed direction, the burred cutter 37 having the effect of allowing the material taken from the face 36 to egress in the arrowed direction 38 within the system ie the primary hydrolysis zone of the primary system.

The primary system comprises the two heat exchange members 5 shown in cross section as 1A. The preferred vertical movement of the circulatory saturated steam with (in normal operating conditions) the hydrolysing lignocellulosic material entrained therein is through the ducts 5A. Each heat exchanger 5 and/or 16 is preferably about 20 m high.

By way of example the particles being fed in at 3 into the circulating stream 3 of the primary system would be arranged such that the material is carried at a velocity of about 30 meters/sec through the tubes of the shell and tube type heat exchanges 5. The gas stream is given its velocity by a series of high pressure and high temperature resistant fans or blowers 4 preferably positioned at the base of each of the heat exchangers although it is not essential that each bank be closely associated with a single fan or blower, It is preferable that there be a number of blowers or fans.

As the lignocellulosic material introduced at 3 contacts the high temperature high pressure gas stream (saturated steam) it will begin to give up its water very quickly. There is therefore the prospect that in normal operation after start up that water carried by the feed materials or in wet materials may provide a sufficient source of water in the primary system to maintain the desired saturated steam environment. However, provision is made for water injection at 10 into the primary system as it is desirable to use water injection during start up in order to create the required initial saturated environment in the primary system and as a primary means to control the heat system irrespective of the amount of water carried into the primary hydrolysis zone by the feed material.

The temperature/pressure environment of the primary system is constantly regulated by the removal of bled off steam via pipe 23, at least part of which is preferably used as a heating medium in the secondary stage. Excess steam not required to heat the secondary system is discharged from pipe 21 and is capable of producing electrical energy by turbine or may be used in some other way.

A high efficiency cyclonic separator 7 (cyclone) is provided at the end of the circulatory gas stream to separate the circulating gas stream from the solids being removed, the solids moving downwardly from the cyclone to be accumulated or to be immediately transferred into the secondary system.

The means whereby the material may be transferred is an auger or screw feed 9 which is adapted to act as a final measure of control of the dwell time of the lignocellulosic materials in the primary system. That screw or auger arrangement 9 is in association with a pressure reducing system 11, the role of which is to minimise the loss of saturated steam from within the primary system into the secondary system. This pressure reducing system can be, for example, the arrangement as shown in FIG. 2a to 2e.

FIG. 2A to 2E shows the method by which it is proposed to transfer the semi-wet solids from the high pressure hydrolysing environment to the lower pressure superheat drying system. The diagram shows a cylinder with differential bores, closed by ends having entry ports drilled and tapped for high pressure steam supplied delivery point on the hydrolysis circulation tubes. The entry point shown at the top of the diagrams represents the delivery point on the hydrolysis system cyclone. The unit is directly open to the hydrolysis circulation tube atmosphere. The exit point at the bottom of the diagrams is the outlet into the drying side circulation tube. The purpose of the device is to accept the material from the hydrolysis side and to deliver it to the drying diameters consistent with the cylinders and are free to move but well sealed inside the cylinder. The pistons provide a cut-off or exposure as required to the delivery and exit points. The piston shown on the left hand side of the diagrams has a steam return passage which contains a non-return valve allowing steam to pass from between the pistons but not the other way. The purpose of the differentiated piston/cylinder system is to effect positive movement of the pistons in the bores by application of pressure to the greater diameter ["back"] which dictates motion is spite of the same pressure applied to the minor diameter. In passing the material from one atmosphere to the other, the device operates a repetition of a four part cycle. These cycles are illustrated sequentially with the fifth diagram showing a repetition of the first diagram. In the first diagram it can be seen that the left hand piston has no pressure applied to the back whilst pressure is applied to the back of the other. The cavity between the pistons is supplied with solids and becomes partially filed. Pressure is applied to the back of the left piston which moves to reduce the volume of the cavity since pressure is still applied to the right piston. The pressure in the cavity will increase to squeeze the steam contained back through the passage to the delivery port. In cycle 3, the pressure at the back of the right piston is exhausted so that the piston moves to uncover the exit port when the solids are blown out by the residual steam into the lower pressure area. Cycle 4 sees the pressure reapplied to the back of the right piston which moves to compress the gas remaining in the cavity so that when the pressure is exhausted from the back of the left piston, it moves to the left in position to repeat cycle 1.

The device would be installed in pairs with the operating cycles offset so that the filling cycle can allow a delivery spout positively actuated to fill the appropriate side alternately, giving a complete cut-off at the end of each fill. They would be dimensioned so that the cavity can never be more than 50% filled with solids at full flow-rate. The ports at the end of the cylinders are each connected to a two way spool valve so as to either supply system pressure or vent to atmosphere. The cycles are extremely simple and the only refinement will be a slight cut-off to the removal of the pressure on the back of the left piston at the end of cycle 4, in order to allow the pressure to build up in the cavity and to provide for positive movement. The cycling of the device will be directly affected at a fixed rate. It is suggested that the complete cycle be repeated at the rate of 300 per minute. At this rate the inertial loads should not be high and a cut-off for cushioning should eliminate inertial shocks.

A full description of the transfer device is contained in New Zealand Patent Specification No. 231550 filed 28 Nov. 1989 by Convertech Group Limited and the full content thereof is hereby here introduced by way of reference.

Residence time of the lignocellulosic materials in the primary hydrolysis zone as well as the state of the saturated steam contained therein is determinative of the end product likely to be obtained after the secondary hydrolysis/drying zone has had its effect on the material. The timing system as indicated earlier comprises a preferably lightly loaded horizontal screw conveyer contained in a pressure case casing and capable of constant transfer times variable by rotation speed and this has been depicted generally by element 9.

Upon transfer into the superheated gas stream 14 of the secondary system there has been movement of the solids from the high pressure primary hydrolysis (saturated steam) into a lower pressure (for example 5 bar) with the apparatus 11 described in detail in relation to FIG. 3 having the capability of controlling the ratio of solids in steam being moved from one system to another in order to achieve the required steady state flow into the next stage ie minimising the amount of saturated steam moving from the primary system into the secondary system.

That moisture contained in and on solids material being moved into the secondary system (which will be considerable) will flash to steam as the material explosively enters the drying environment at point 14. The material, on reaching the low pressure environment, effects a chemical shredding analogous to the effect of a sudden release in explosion hydrolysis.

The material enters a drying stage which is very similar in general design to the primary hydrolysis stage. The cyclone 18 simply being provided at the dry end of the system where the material can be dispensed through a medium pressure rotary valve 19 to where the material might be required ie part of it might be diverted to a combustor while the remainder may be diverted to a panel or board forming system whereby without application of other materials a board can be self polymerised from the solids material under appropriate pressure and temperature.

The drying side residence time is very short, say 3–5 seconds and depends upon the distance/velocity. The heat system has to be designed to be capable of drying the maximum solids flow at a maximum moisture content at the minimum temperature and the effect is that material which is dried quickly merely continues to end of the system as bone dry without ill effect. Material requiring longer residence simply continues to give up moisture for longer. The temperature is low enough that there is no pyrolysis or heat damage.

The atmosphere in the secondary system is maintained superheated at all times and circulated by fans or blowers 15 so that a similar movement occurs through the tubes 16A of the heat exchanges 16. The drying rate at quite modest temperatures is extremely fast.

The shells of the heat exchangers 16 are preferably supplied with heat via the excess steam from the primary hydrolysis section as can be seen from FIG. 1 ie it is delivered from pipe 23. Condensate taken from the base of exchangers 16 will give a considerable amount of hot water. There will also be an excess of superheated steam which is taken via pipe 20 to maintain the desired atmosphere balance in the drying system.

The effectiveness of the drying system is dependent upon the hydrolysis/evaporation section and the two sections run as one in a steady state (there being believed to be at least some continuing hydrolysis in the evaporative section) and hence the nomenclature secondary hydrolysis system or hydrolysis/drying system.

The system is capable of running accurately and can be controlled to very close limits with conventional automation in complete harmony with the chip or other solids material input and the output requirements. With proper design there should be no sticking or fouling in the system and routine maintenance downtime should be less than conventional equipment.

An important feature of the invention is that it makes it possible to make improvements to the present known methods of carrying out steam hydrolysis.

Present methods include various processes where the material to be hydrolysed is contained in a vessel where it is subjected to heating by pressurising the vessel with saturated steam. Some processes are continuous where the material is passed through a vessel which is under moderate pressure by the injection of steam from a separate boiler and this is conventional practice in the timber and other industries. There are some specialist applications where the continuous systems in which quite high steam pressures are used with steam supplied from an external boiler. In other applications where the degree of heat treatment is required to be more severe hydrolysis is often done as a series of batch operations in a closed vessel. The material is placed in the vessel and the vessel is closed, the steam is introduced with pressure being maintained until the steaming period is completed. The steam is then turned off just before the materials is released from the vessel. This process is commonly known as "explosion hydrolysis" because the treated material is often expelled violently from the vessel to achieve a shredding effect.

In all cases where steam is introduced from separate boilers, there is an initial condensation as the steam enters the vessel to encounter the relatively cold mass. Cooling of the vessel between the batches also adds to the condensation. The effect of this is to raise the amount of moisture in the vessel and to extend the time required for the heat transfer to bring the contents up to the desired temperature.

Because the water introduced cannot be heated in the short time available accurate control of the internal temperature is not possible. Two theoretical temperatures are found in the vessel ie the temperature of the steam and the lower temperature of the water. In most known methods of carrying out the hydrolysis process, an undesirable increase in moisture content of the vessel during the heating stage is unavoidable. The increase in the moisture also has the effect of retarding the rate of hydrolysis due to dilution of reaction acid, a condition which is variable because of the unpredictable dispersion of the water.

The present invention eliminates the problems caused by the increase in the moisture content of the material treated. Substance particles to be hydrolyised are in a dynamic condition of suspension as they pass rapidly through the heat exchange system in the carrier saturated steam. Immediately upon entering the hydrolysing atmosphere the individual particles are almost instantaneously bought up to the correct temperature with only an extremely brief condensation stage. Extra steam generated by the evaporation of moisture from the particles is constantly regulated by the extraction of the excess vapour to maintain a temperature - stable dry saturated steam atmosphere. As the particles pass through the system, water is progressively given up so as to increase the acid levels in the hydrolysis reactions, therefore increasing the rate of hydrolysis. At the end of the predetermined residence time when the material is expelled from the hydrolysing atmosphere it is dryer than at the point of injection.

The advantages of the invention include the ability to control the hydrolysis process with great accuracy because of the uniform and predictable heat transfer gradient. The residence time can be very short of the order of a few seconds but is infinately variable upward to allow for very close tolerances in treatment times. Uniform hydrolysis conditions and the ability to accurately control hydrolysis time, is of utmost importance in order that the desired reaction sequences can be achieved and repeated reliably.

The material is effectively in suspension during passage through the heat exchange system because of the dynamic nature of the carrier system. Very little physical contact is made with the hot surfaces of the heat exchanges which prevents the possibility of sticking, burning or fouling which would occur with any attempt to heat an inert mass in a vessel with heat transfer surfaces.

Possible applictions for the system

Woody plant material is composed of 40–55% cellulose, 24–40% hemicellulose, and 18–28% lignin. Cellulose is a polymer of glucose sugar units that serves as the principal structural component of terrestial plants. Hemicellulose is also a sugar polymer, but it is primarily composed of five-carbon sugars such as xylose rather than the six-carbon sugar glucose contained in cellulose. The remaining component of wood, lignin, is a complex polymer of aromatic sub-units. This tough material coats the bundles of cellulose fibres and binds them together to provide the wood with rigidity and resistance to breakdown. Cellulose, hemicellulose and lignin make up 96–98% of the dry weight of a tree. The first operation of the bio-refinery is the separation of these components and this is the function provided by the present system.

Many alternatives exist for conversion of the intermediate cellulose, pentose (hemicellulose) and lignin fractions into products for sale. The following classifications, taken from a paper buy W. H. Klausmeier entitled "Configurations for a Forest Refinery", prepared for the US Department of Energy, list these alternatives.

I. Applications for Cellulose Pulp

A. Cellulosic Products 1. Textiles and films (regenerated cellulose and celulose acetate)

a) Rayon b) Cellophane c) Cellulose acetate 2. Water-soluble polymers a) Carboxymethyl cellulose b) Cellulose sulfonates 3. Other chemical derivatives a) Cellulose acetate-butyrate b) Cellulose nitrate c) Ethyl cellulose d) Methyl cellulose B. Cellulose-Derived Glucose 1. Glucose 2. Fructose 3. Sorbitol 4. Hydroxmethyl furfural 5. Methyl glucoside 6. Fermentation products a) Lactic acid b) Itaconic acid c) Gluconic acid d) Xanthan gum e) Citric acid f) Glycerol g) Torula yeast h) Acetone/n-butanol i) Ethanol j) Butylene-2,3-glycol II. Applications for Pentose Sugars A. Minor products During hemicellulose hydrolysis, small amounts of acetic, uronic and formic acids, as well as mannose, arabinose and galactose sugars are liberated. Acetic and formic acids were recovered from spent sulfite liquors in the past.

B. Furfural and derivatives: 1. Adiponitrile 2. Nylon 3. Lysine 4. Furfuryl alcohol 5. Glutamic acid 6. Polyurethance foams, resins and plastics 7. Haologenated and nitrogenated derivatives for drug manufacture C. Xylitol D. Glycerol and other glycols E. Fermentation products: 1. Ethanol 2. Acetone/butanol 3. Torula yeast 4. Butylene-2,3-glycol III. Applications for Lignin A. Vanillin B. Lignosulfonates [continued] C. Polyurethane polyol foams D. Sulfur chemicals E. Phenol and substituted mononuclear phenols F. Lignin-pyrolysis products G. Activated carbon and charcoal H. Benzene and phenol The biomass-based processes selected all represent direct-substitution options. They offer alternative routes to chemicals that are currently manufactured from petroleum and natural gas. There are also indirect-substitution options. In these options, biomass-based processes yield products that are not identical with petro-chemical products on the market but than can perform the same functions as, and can therefore substitute for, petrochemical products. Cellulosic textile fibres and lignin based polyurethane foams are examples of indirect-substitution products. Many biomass-based products, such as rayon, were displaced by lower petroleum costs and a better understanding of biopolymers. The opportunity to reverse this trend is significant.

The significance of this is that a complex of plants could be integrated into an efficient biomass fed chemical refinery able to produce all of it's own feed, energy, solvents, processing supplies etc all from the one input material source.

Fuel

The Convertech System can be used for a highly efficient means of converting wet ligno-cellulose materials to bone dry solids for use as fuels. If the product is to be burned at the end of the system it can be left in a particulate state and burnt directly to produce a smokeless and clean burning fuel for large size combustion units, boilers, etc. The surplus steam from the system can also be tied in to the energy plan as the system itself has the capacity to develop large quantities of high pressure steam. If fuel is to be manufactured for storage or transportation it can be extruded into a high density pellet. The pellets may be stacked in piles outside where they will be unaffected by weather because of the very high density and the non-absorbent properties of the product. The fuel pellets burn extremely well on grates and can be used for smokeless domestic or industrial fuels. It may be practical in some cases to create fuel plants where two or more stages of hydrolysis are used with chemical extraction as a bye-product.

Animal Food

It is well known that ligno-cellulosic materials have considerable nutritive value particularly for ruminants, except that in any unprocessed form they are almost totally indigestible. Alkaline hydrolysis is commonly practised to improve the digestibility of agricultural residues for this purpose, but the process is expensive because it uses sodium hydroxide. Woody fibre can be processed through the Convertech System to give a maximum digestibility and this would be attended by very low costs compared with conventional methods.

Considerable work has been put into trying to improve the nutritional value of cereal straws by the use of high pressure steam. The United States Department of Agriculture abandoned basically successful trials because the treatment with the existing equipment appeared to be impractical at farm levels and economically hopeless commercially. It is quite well known that with successful and economic hydrolysis of straw a food value approximating 80% of that of cereal grains can be achieved. The process must be such that the low cost residues are able to be processed to show an advantage against the use of grain as a feed base.

It is likely that animal foods could be made from practically every form of cellulose including materials like peat and even animal wastes. Most severe environmental pollution results from factory farming where large numbers of animals are concentrated on small areas of land. The disposal of animal wastes is an enormous problem and it is a reasonable theory that these fibrous residues can be processed in a Convertech plant to convert them to dry solids for use as fertilisers, fuels or even converted back to animal food. A profit is made at the same time that a severe pollution problem is eliminated.

Pulp and Paper

A number of sequential hydrolysis steps will economically provide excellent pulps. It is also probable that this almost totally pollution free system will produce, as by-products, sufficient valuable chemicals to substantially reduce the cost of pulp production. There is a very strong incentive to develop new and environmentally acceptable paper pulping processes. The Convertech system shows tremendous promise in this field with the potential to provide economies in the front end capital requirements as well as extremely low operating and maintenance costs.

Injection Moulding

The hydrolysed and dried material is somewhat granular and not necessarily able to be described as fibrous. The standard particles would be quite suitable for injection moulding with standard screw injection presses into heated dies. The possibilities of this process are unlimited if one can envisage large quantities of Convertech fibre being injected into very large dies, the result would be somewhat similar to the effect of polyurethane moulding except that the product would be much heavier and also much stronger. The material will flow quite satisfactorily with properly designed equipment and the low cost of the raw material would make very large mouldings practical. It does not require a great leap into the future to imagine such things as housing components such as doors, window frames, cabinets and furniture, pallets etc being made in this way. In higher density versions of this kind of product one can think in terms of a very low cost fibre reinforced "bakelite" type material. It can be used for practically anything in which a certain degree of brittleness can be tolerated. Electrical components and things which used to be made out of bakelite should be possible.

Extrusion forming

It is probable that investigation of this technique would be very fruitful. Standard furnish can be continuously extruded through heated dies into an almost unlimited variety of complex shapes. These could be very large in volume, if desired, and naturally various kinds of cored panelboards can be extruded. Building mouldings like skirtings and exterior fascias are the obvious application but the possibilities are unlimited.

"Panelboard Products"

This category includes what could be described as flat sheet products made by conventional or continuous pressing.

Hardboard [Fibreboard]

A product superior to the very best product already made has the main product potential. There is no thickness limitation and densities can generally be much lower than the normal hardboard densities to get the same strength. The product is capable of withstanding all known wet and exposure performance tests. If it is required to render the board totally non-absorbent some additives or additional processes may need to be adopted. Very high densities can be produced where special properties are desired and these can include ceramic-like characteristics with good fire resistance.

MDF [Medium Density Fibreboard] This is the same product as described above but at a lower density. Excellent properties are found with a more "sunburned" colour compared with "standard" MDF.

Low Density Board Low density board of about 400/450 kg/M3 has been made and this was of quite good quality and performance.

"Light" Board 600 kg/Md and less will make perfectly good board. Low density board can be made to have quit,good strength properties. It should be borne in mind that since no resin solids are added that boards made with natural resins are lighter in any event for the same amount of fibre content. In general, board will be 8–10% lighter for the same fibre weight.

Thin MDF Thin MDF would be similar to the product presently described as hardboard and the densities will be rather similar, so effectively they are the same thing.
Press moulding of deeply formed shapes These would include things like car body parts, door skins or components of various sorts, up to quite large sizes. The flexible mats would be partially cured in the normal production process but with the continuous press running faster. There would be enough cure to make the mat coherent but with a large amount of the natural resin remaining in an unpolymerised state. Some special processing may be required in the form of fixing to polyster mesh or some such process to hold the mat together so that it may be draped over the tools. The same system can also be used with thicker mats for moulding presses to create very large completely finished items such as exterior doors, internal doors and many other building and industrial products. During the last war, the Germans were creating quite complex and very sophisticated products with gunned wood fibre. These included tableware, radio cabinets and all kinds of aircraft and motor parts, etc.

In a similar mode the furnish can be used to make very high density products with many uses in industry. It is possible to consider using a quite high density to produce very effective and almost indestructible floor and roof tiling and many other similar products. In higher densities very good fire resistance is exhibited along with total indifference to water and most solvents. In the same category one would include production of embossed panels using engraved cauls in an ordinary platen press, maybe with four colour printing to produce a quality pre-finished product. This would also be better done as a secondary operation using the partially cured mat from the main production system.

Voidless, completely inert boards with very uniform densities will be possible with extremely elementary forming equipment. Moreover, it is important to keep the furnish hot and it is pointless to put it in a long cooling process simply to get it into a mat. One does not need steam raising equipment, or anything like the complex array of conventional fan farms, resin tanks, refiners etc. Even the forming line space and costs will be minimal. One simply needs an array of heat exchangers with their blowers and ancillary equipment all compactly arranged with the heat energy source being a largish (about 8–10 megawatt) thermal fluid heater. [The forming lines will be almost non-existent because of the nature of the furnish].
Start-up At start-up preferably a heat exchange fluid or liquid, preferably oil, moves into a heat exchange contact with the tubes 5A of the heat exchanges 5, such heat exchange liquid being returned along lines 26. An appropriate combuster could be used to burn, for example a product that has been obtained from the system itself, even for example about 15% of the total dry output if desired.

A feature of the system is however that the heat exchange arrangement is of itself insufficient to supply the needs of the system without a preliminary start-up accumulation of energy within the system and this start-up accumulation over a period of many hours results from the application of heat to the primary system by the heat exchange liquid in lines 25 and 26 through the heat exchange means together with water injection from 10 to build up the required saturated steam in the system and take the system up to substantially steady state temperature and steam conditions. At the same time the temperature of the secondary system can be taken up by means, if desired, not shown, or preferably by a bleeding off of some of the steam along lines 23 during the start-up sequence.

In operation, however, the dry saturated steam in the primary system could move at about 20 m/s or 30 m/s be in the range of from 20 bar/212.4° C. through to 42 bar/253.2° C. (eg 35 bar/242.5° C.) or any other desired conditions. In the secondary system a superheated steam atmosphere is desirably maintained where the input to the heat exchangers is in the temperature region of 200° C. to 245° C. It is thought that the desirable temperature/pressure conditions for the superheated drying will be maintained at about 5 bar/150° C.

In both parts ie the primary and secondary systems the excess/surplus steam is removed during normal operations after start-up in order to regulate the atmosphere in the system. The water to provide the steam atmosphere in the hydrolysis system is provided by evaporation of water contained in the raw materials solid or, if necessary, water injection at 10. If the water contained in the feed solids exceeds the capacity of the evaporative system then the feed rate will be reduced to maintain equilibrium since it is not an option to vary dwell times for that purpose in the primary system.

It should be taken as a basic position that the primary heat input into the heat exchange liquid movement will be constant and that the heat exchangers 5 will be operating at a substantially constant rate throughout. With this understood it is clear that the best method whereby the atmosphere within that system can be controlled is by the means described ie the water balance.

In a preferred form of the present invention where wood chips are the feed material and the desired output is not material to provide energy as in New Zealand Patent Specification No. 231577 (filed 29 Nov. 1989 by Convertech Group Limited) but to provide a material capable of being pressed as a panel or board or into some other form the dwell time in the primary system is brief, for example from about 15 seconds to about 40 seconds, but may be longer. A main factor in the accurate control of dwell or residence time in the primary hydrolysis system is the need for accuracy and reproducability. The prime factor is the circulation velocity which must be at an optimum rate consistent with reliable solids flow and heat transfer time. It is not thought desirable to attempt residence time control by fan or blower control and ideally the blower should operate at a steady state optimum. That being the case, therefore, the length of travel in the system should be such that a sufficient dwell time control can be obtained with the screw or auger arrangement 9. While preferably such auger control is preferably automated it can of course be manually controlled.

In the secondary system or drying stage there is no opportunity to modulate the material flow since it must take everything that comes through from the primary hydrolysis stage. The drying conditions can and should be variable in the choice of temperatures best suited to material properties. The material flow rate is not necessarily constant and can reduce to a trickle or even stop completely.

Drying residence time is directly controlled by the gas velocity and drying rate will be controlled by the temperature and level of superheat. The system will be designed to dry any expected volume from the primary hydrolysis section from entry moisture level down to the desired dryness.

Board Extrusion Injection Moulding etc [For example self polymerisable board"].

It is a well known phenomonem that hydrolysed ligno-cellulosic materials exhibit an ability to be formed under heat and pressure into a solid mat or board without the addition of synthetic resins or binders. This was demonstrated commercially on a large scale by the "Masonite" hardboard process.

The Mason patents taught explosion hydrolysis followed by a wet process after which the wet fibre was pressed into sheets at elevated pressures and temperatures without synthetic binders. It was stated that the binder was formed by a depolyermerisation/repolymerisation process of lignin.

Much work has been done using hydrolysed ligno-cellulosic fibre which was subsequently dried to a low moisture content prior to being formed into solid articles under heat and pressure without the pollution associated with the wet process. For instance, Suchsland, Woodson and McMillin presented a paper on Jun. 21, 1982 at the 36th annual meeting of the Forest Products Research Society in New Orleans and published in the Forest Products Journal in the Apr. 1983 issue. The researchers confirmed that "highly reactive pulps can be formed dry and pressed dry without resin into a hardboard of superior qualities.

The hydrolysis process for the manufacture of successful compressed products must be carefully controlled according to time and temperature and does not necessarily require substantial decomposition of the hemicellulose.

In the manufacture of strong and water resistant sheets, the hydrolysed, substantially dry fibre may be formed into a met, preheated to a predetermined temperature and then inserted into a press with a platen temperatures of the region of 210°–220° C. and pressed at about 3.5 Mpa for about 10 seconds per millimeter of thickness in the case of thin sheets and progressively longer for thicker sheets.

What is claimed is:

1. Apparatus for the hydrolysis of lignocellulosic materials comprising:

a primary reaction zone adapted to have steam circulating therein and reactants passing therethrough;

primary inlet means to said primary reaction zone;

means for heating and pressurizing said primary reaction zone to a temperature and a pressure sufficient to cause and support hydrolysis of hydrolyzable lignocellulosic material therein in contact with saturated steam and to convert water to steam;

means for feeding water to said heated primary reaction zone whereby providing steam at said temperature and pressure therein;

means for feeding solid hydrolyzable lignocellulosic material to said primary reaction zone into contact with saturated steam therein:

means for entraining said solid hydrolyzable lignocellulosic material in said steam in said primary reaction zone;

means for bringing said entrained hydrolyzable lignocellulosic material to said hydrolysis conditions in said primary reaction zone to form a primary product stream comprising steam at least partially hydrolyzed lignocellulosic material and heated hydrolysis products;

means for bleeding steam out of said primary reaction zone;

means for circulating at least most of said steam back to the primary inlet means of the primary reaction zone into entraining contact with said solid hydrolyzable cellulosic material:

primary outlet means from said primary reaction zone;

a secondary reaction zone adapted to have steam therein and to pass at least partially hydrolyzed lignocellulosic material and heated pyrolysis products therethrough;

secondary inlet means to said second reaction zone;

means, operatively associated with said primary outlet means and said secondary inlet means for receiving said primary product stream from said primary reaction zone, transferring said primary product stream, and feeding at least steam and said heated solid hydrolysis products to said secondary reaction zone without any substantial loss of steam;

means for heating and pressurizing said secondary reaction zone to a pressure lower than the pressure in said primary zone and a temperature sufficient to flash water out of said product stream upon introduction thereof into said lower pressure secondary zone, to cause drying of said at least partially hydrolyzed lignocellulosic material and said hydrolysis products, and thereby reducing the water content of said primary product stream;

means for entraining said primary product stream in said steam of said secondary reaction zone:

means for removing steam from said secondary reaction zone in an amount sufficient to maintain steam in said secondary reaction zone in a superheated condition;

means for circulating at least some entraining steam from said secondary reaction zone back to said secondary inlet means;

secondary outlet means from said secondary zone; and means to recover a dried product stream comprising at least said partially hydrolyzed lignocellulosic material and hydrolysis products thereof from said secondary outlet means.

2. Apparatus as claimed in claim 1 including a fan operatively associated with said primary reaction zone operable to cause the entrainment of said solid lignocellulosic material in said steam and to circulate said steam entrained hydrolyzable lignocellulosic material in said primary reaction zone between said primary inlet thereto and said primary outlet therefrom.

3. Apparatus as claimed in claim 1 including a fan operatively associated with said secondary reaction zone capable of circulating steam and hydrolyzed lignocellulose solids in said secondary zone between said secondary inlet thereto and said secondary outlet therefrom.

4. Apparatus as claimed in claim 1 wherein said outlet means from said primary reaction zone comprises cyclone separation means sufficient to separate a substantially solid hydrolysis product and steam.

5. Apparatus as claimed in claim 1 wherein said outlet means from said secondary zone comprises cyclone separation means sufficient to separate a substantially solid, dry hydrolysis product and steam.

6. Apparatus as claimed in claim 1 including means to cause the pressure and the temperature of said superheated steam in said secondary zone to be sufficiently high to further hydrolyze solids being fed thereto.

7. Apparatus as claimed in claim 1 wherein said screw means is rotatable at variable speeds sufficient to control the passage of heated solid materials from said primary reaction zone to said secondary zone and sufficient to substantially prevent the passage of saturated steam, in close association with said heated solid materials, from said primary reaction zone to said second zone.

8. Apparatus as claimed in claim 1 including means to bleed off saturated steam from said first reaction zone and to heat said second zone by contact with said bled steam.

9. Apparatus as claimed in claim 1 including comminution means into which said lignocellulosic solid materials are fed prior to the feeding thereof to said primary reaction zone.

10. The apparatus as claimed in claim 1 wherein said transfer means comprises an enclosed screw means.

* * * * *

UNITED STATES PATENT AND TRADEMARK OFFICE
CERTIFICATE OF CORRECTION

PATENT NO. : 5,454,911
DATED : October 3, 1995
INVENTOR(S) : Andrew J. Rafferty

It is certified that error appears in the above-indentified patent and that said Letters Patent is hereby corrected as shown below:

On the title page, item [75] Inventors: insert --Kenneth Eli Scott, Rangiora, New Zeland --.

Signed and Sealed this

Twenty-fifth Day of June, 1996

Attest:

BRUCE LEHMAN

Attesting Officer  Commissioner of Patents and Trademarks